United States Patent
Photos et al.

(10) Patent No.: US 11,931,687 B2
(45) Date of Patent: Mar. 19, 2024

(54) GAS PURIFICATION APPARATUS AND METHOD

(71) Applicant: Streamline Innovations, Inc., San Antonio, TX (US)

(72) Inventors: Peter J. Photos, Boerne, TX (US); Franklin Hailey Brown, II, San Antonio, TX (US); John Bourdon, Peculiar, MO (US); Trey Taylor, Belton, TX (US)

(73) Assignee: STREAMLINE INNOVATIONS, INC., San Antonio, TX (US)

( * ) Notice: Subject to any disclaimer, the term of this patent is extended or adjusted under 35 U.S.C. 154(b) by 47 days.

(21) Appl. No.: 17/672,483

(22) Filed: Feb. 15, 2022

(65) Prior Publication Data
US 2023/0256379 A1    Aug. 17, 2023

(51) Int. Cl.
*B01D 53/04* (2006.01)
*B01D 53/047* (2006.01)

(52) U.S. Cl.
CPC ....... *B01D 53/047* (2013.01); *B01D 53/0446* (2013.01); *B01D 2256/16* (2013.01); *B01D 2256/20* (2013.01); *B01D 2257/504* (2013.01)

(58) Field of Classification Search
CPC .................. B01D 53/14; B01D 53/52
See application file for complete search history.

(56) References Cited

U.S. PATENT DOCUMENTS 9,902,914 B2 * 2/2018 Mak .................. B01D 53/1406
2017/0114295 A1   4/2017 Mak

FOREIGN PATENT DOCUMENTS

| EP | 0066307 A2 | 12/1982 |
| EP | 0204847 A2 | 12/1986 |
| EP | 0243542 A1 | 11/1987 |

OTHER PUBLICATIONS

International Search Report dated May 19, 2023 issued in PCT/US23/61722.
Written Opinion dated May 19, 2023 issued in PCT/US23/61722.

* cited by examiner

*Primary Examiner* — Sharon Pregler
(74) *Attorney, Agent, or Firm* — Jayne M. Saydah

(57) ABSTRACT

An integrated amine and redox gas treatment system is configured to treat an influent hydrocarbon containing stream. The system includes a reduction oxidation unit connected directly downstream of an amine unit. The amine unit is configured to separate the influent fluid stream into a first amine effluent stream including hydrocarbons and a second amine effluent stream including a connection pressure and comprising $CO_2$. The reduction oxidation unit is configured to receive the second amine effluent stream from the amine unit and operate at the connection pressure while releasing a reduction oxidation effluent stream including purified $CO_2$. The connection pressure includes a single pressure or a plurality of pressures at which both the amine unit and the reduction oxidation unit are configured to operate.

14 Claims, 4 Drawing Sheets

GAS PURIFICATION APPARATUS AND METHOD

BACKGROUND OF THE DISCLOSURE

1. Field of the Disclosure

The present invention relates to a gas purification and processing apparatus and method. More specifically, it relates to an apparatus and method of gas purification by separating a gas into multiple components such as natural gas, carbon dioxide and sulfur.

2. Description of the Related Art

The demand for natural gas has increased exponentially over the past few decades and continues to increase. Gas production has traditionally been sourced from sweet gas fields which produce natural gas with little to no undesirable constituents. However, as gas demand increases, natural gas production is increasingly being extracted from fields containing sour natural gas which includes undesirable constituents, such as hydrogen sulfide and carbon dioxide, that must be removed to generate natural gas suitable for consumer use and sale.

Purifying sour natural gas involves separating the natural gas from the components such as water, $CO_2$ and $H_2S$. Conventionally, sour gas purification is performed in stages by discrete gas treatment systems. For example, sour natural gas may be purified by an amine system which serves as first stage and a reduction oxidation ("redox") system which serves as the second stage. During the first stage, the amine system may generate purified natural gas, but the amine system also may generate a tail gas including a toxic gaseous mix of $CO_2$ and $H_2S$ that requires second stage treatment. A redox system may be utilized in the second system stage to purify $CO_2$ and sulfur.

Due to differing operating conditions, amine and redox systems are separate systems that lack integration. More specifically, amine and redox systems utilize different operating pressures. For example, the effluent tail gas of the amine system is generally of too low a pressure to be utilized by a redox system. As a result, before the tail gas may be processed by a redox system, the tail gas must be compressed by at least one or a series of compressors to bring the tail gas up to the operable influent pressure for the redox system. Second, amine systems are not always near redox systems so the tail gas must be transported via pipes or tanker trucks over a distance to an available redox system. This transportation may lead to pressure loss through the pipe and/or in transferring the gas to the tanker truck and then to the redox unit. As a result, the tail gas must also be pressurized utilizing compressors.

The lack of integration of the amine and redox systems leads to process inefficiencies. Compressor use prior to the tail gas entering the redox contactor causes increases in the initial capital expenses for the redox system, and the gas transportation and compressor operation causes increased maintenance and operating expenses. Additionally, the compression of the gas increases the amount of processing time.

Therefore, there is a need for a more efficient, integrated amine and redox gas purification system capable of processing gas to generate purified natural gas, $CO_2$ and sulfur by obviating the need for compression of the amine tail gas.

BRIEF SUMMARY OF THE DISCLOSURE

A gas treatment system, according to this disclosure, includes an amine unit connected upstream of a redox unit. The amine and redox units both operate at the same or substantially equivalent pressure or range of pressures. As a result, effluent fluid from the amine unit may be transferred to the redox unit at constant pressure and without further compression. Therefore, the initial capital expenditure, ongoing maintenance costs and processing times are reduced.

Another aspect of the invention, according to this disclosure, is a gas treatment system configured to treat an influent fluid stream including hydrocarbons and $CO_2$. The system includes an amine unit and a reduction oxidation unit. The amine unit is configured to separate the influent fluid stream into a first amine effluent stream including hydrocarbons and a second amine effluent stream including a connection pressure and comprising $CO_2$. The reduction oxidation unit is downstream of the amine unit, and the reduction oxidation unit is configured to receive the second amine effluent stream from the amine unit and operate at the connection pressure while releasing a reduction oxidation effluent stream including purified $CO_2$. The connection pressure includes a single pressure or a plurality of pressures at which both the amine unit and the reduction oxidation unit are configured to operate.

In a second aspect of the invention, according to this disclosure, the amine unit is connected directly upstream of the reduction oxidation unit such that the second amine effluent stream flows directly from the amine unit to the reduction oxidation unit.

In a third aspect of the invention, according to this disclosure, the second amine effluent stream remains at the connection pressure as it flows downstream from the amine unit to the reduction oxidation unit.

In another aspect of the invention, according to this disclosure, the reduction oxidation unit further comprises a co-current and countercurrent contactor configured to operate at the connection pressure while contacting a reducing reagent and the second amine effluent stream, and the contactor configured to release the reduction oxidation effluent stream including purified $CO_2$.

In yet another aspect of the invention, according to this disclosure, the reducing reagent comprises ferric salts, ferrous salts, ferric chelants, ferrous chelants, Fe-MGDA, HEME, organisms containing HEME, or a combination thereof.

Another aspect of the invention, according to this disclosure, includes gas treatment system configured to receive an influent fluid stream including hydrocarbons. The system includes an amine unit, a water separation unit and a reduction oxidation unit. The amine unit is configured to separate the influent fluid stream into a first amine effluent stream including hydrocarbons and a second amine effluent stream including a connection pressure and comprising CO2, water vapor or a combination thereof. The water separation unit is downstream of the amine treatment unit, and the water separation unit is configured to receive the second amine effluent stream and reduce the water vapor from the second amine effluent stream and a separator effluent stream including the connection pressure and comprising $CO_2$. A reduction oxidation unit is downstream of the water separation unit, the reduction oxidation unit is configured to receive the separator effluent stream from the water separation unit and operate at the connection pressure while releasing a reduction oxidation effluent stream including purified $CO_2$. The connection pressure includes a single pressure or a plurality of pressures at which both the amine unit and the reduction oxidation unit are configured to operate.

In another aspect of the invention, according to this disclosure, the water separation unit is directly downstream of the amine unit and directly upstream of the reduction oxidation unit.

In yet another aspect of the invention, according to this disclosure, the amine unit includes an amine contactor and an amine reagent regeneration unit. The amine contactor is configured to contact the influent fluid stream and an amine reagent stream and release the first amine effluent stream and a contacted reagent stream including the amine reagent and CO2. The amine reagent regeneration unit is downstream of the amine contactor and the amine reagent regeneration unit is configured to regenerate the contacted amine reagent stream while operating at the connection pressure. Also, the amine reagent regeneration unit is configured to release the second amine effluent stream from the amine unit to the water separator unit.

In another aspect of the invention, according to this disclosure, the reduction oxidation unit includes a reduction oxidation contactor configured to receive the separator effluent stream and configured to operate at the connection pressure while contacting a reducing reagent and the separator effluent stream. The reduction oxidation contactor is configured to release the reduction oxidation effluent stream including purified CO2.

In another aspect of the invention, according to this disclosure, the contactor includes a bi-directional contactor configured for both countercurrent and co-current contact between the separator effluent stream and the reducing reagent.

In another aspect of the invention, according to this disclosure, the water separation unit is a condenser.

In another aspect of the invention, according to this disclosure, the reducing reagent includes ferric salts, ferrous salts, ferric chelants, ferrous chelants, Fe-MGDA, HEME, organisms containing HEME, or a combination thereof.

Another aspect of the invention, according to this disclosure includes a method of purifying $CO_2$ from a hydrocarbon containing gas stream. The method includes the steps of operating, at a connection pressure, an amine regeneration unit to regenerate a contacted amine reagent; releasing from the amine regeneration unit an amine effluent fluid stream including the connection pressure and comprising $CO_2$; contacting in a redox contactor, which is operating at the connection pressure and downstream of the amine regeneration unit, the amine effluent fluid stream with a reducing reagent; and releasing purified $CO_2$ from the redox contactor while the redox contactor operates at the connection pressure, wherein the connection pressure includes a single pressure or a plurality of pressures at which both the amine regeneration unit and the contactor are configured to operate.

In another aspect of the invention, according to this disclosure, the step of contacting in a redox contactor includes the step of contacting the reducing reagent and the amine effluent fluid stream both the co-current and counter-current directions within the redox contactor.

In another aspect of the invention, according to this disclosure, the step of releasing from the amine regeneration unit an amine effluent fluid stream including the connection pressure and comprising $CO_2$ includes the steps of releasing from the amine regeneration unit an amine effluent fluid stream including the connection pressure and comprising $CO_2$, water vapor, or combination thereof; and condensing the water vapor in the amine effluent fluid stream using a water separation unit.

In another aspect of the invention, according to this disclosure, the method includes the step of transferring the amine effluent fluid stream directly from the water separation unit to the redox contactor.

In another aspect of the invention, according to this disclosure, the step of contacting in a redox contactor, which is operating at the connection pressure and downstream of the amine regeneration unit, the amine effluent fluid stream with a reducing reagent includes the step of using a reducing reagent including ferric salts, ferrous salts, ferric chelants, ferrous chelants, Fe-MGDA, HEME, organisms containing HEME, or a combination thereof.

Another aspect of the invention, according to this disclosure includes a method of making a gas treatment system for the purification of hydrocarbon and $CO_2$ gases from an influent fluid stream including hydrocarbon and $CO_2$ gases. The method includes the steps of providing an amine contactor configured to contact the influent fluid stream and an amine reagent stream, and release a first amine effluent stream including a purified hydrocarbon stream and a contacted reagent stream including the amine reagent and CO2; providing an amine reagent regeneration unit downstream of the amine contactor, the amine reagent regeneration unit configured to regenerate the contacted amine reagent stream while operating at a connection pressure, the amine reagent regeneration unit configured to release a second amine effluent stream; and providing a reduction oxidation contactor downstream of the amine reagent regeneration unit, the reduction oxidation contactor configured to receive the second amine effluent stream and configured to operate at the connection pressure while contacting a reducing reagent and the second amine effluent stream, the contactor configured to release a purified CO2 stream, wherein the connection pressure includes a single pressure or a plurality of pressures at which both the amine unit and the reduction oxidation unit are configured to operate.

In another aspect of the invention, according to this disclosure, the method includes the step of connecting the reduction oxidation contactor directly downstream of the amine reagent regeneration unit.

In another aspect of the invention, according to this disclosure, the method includes the steps of providing a water separation unit downstream of the amine regeneration unit, the water separation unit configured to receive the second amine effluent stream and reduce a water vapor content; and connecting the reduction oxidation contactor directly downstream from the water separation unit.

In another aspect of the invention, according to this disclosure, the step of providing a reduction oxidation contactor downstream of the amine reagent regeneration unit includes the step of providing the reducing agent comprising ferric salts, ferrous salts, ferric chelants, ferrous chelants, Fe-MGDA, HEME, organisms containing HEME, or a combination thereof.

In another aspect of the invention, according to this disclosure, the step of providing a reduction oxidation contactor downstream of the amine reagent regeneration unit includes the step of providing a bi-directional contactor configured to simultaneously contact the reducing agent and the second amine effluent stream in co-current and counter-current directions, the bi-directional contactor configured to operate at the connection pressure and release a purified $CO_2$ stream.

BRIEF DESCRIPTION OF THE SEVERAL
VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 a first schematic diagram of a first embodiment, according to this disclosure, of a gas treatment unit;

DETAILED DESCRIPTION OF THE INVENTION

Certain terminology is used in the following description for convenience only and is not limiting. As used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Like numbers are used to indicate like elements throughout. Elements, components, and/or features that are discussed herein with reference to one or more of FIGS. 1-4 may be included in and/or utilized with any of FIGS. 1-4 without departing from the scope of the present disclosure. FIGS. 1-4 provide an example of embodiments of a gas treatment unit 10 and methods according to the present disclosure. The gas treatment unit or system 10 and methods may be utilized, for example, to treat hydrocarbon containing gases for the generation of purified or sweetened natural gas, sulfur, $CO_2$, liquid water and intermediaries such as steam and hydrogen sulfide, etc. While the treatment of a hydrocarbon containing gas stream such as sour natural gas extracted from a well is discussed herein, the gas treatment unit 10 and methods 700 and 900, according to the present disclosure, may also be used to treat other gas streams including industrial gases and power generation (i.e., oil processing by-products) gases and for the purposes of purifying $CO_2$, hydrogen sulfide and sulfur. Also, it is recognized that the influent gas treatment parameters, desired treatment/purification standards and operating conditions may allow for modifications to unit 10 and methods 700, 900 by adding or removing elements and/or treatment steps.

Figure 1:
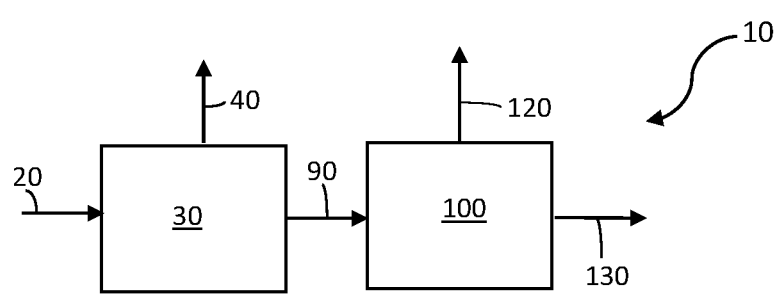

FIG. 1 is a schematic diagram of an exemplary embodiment of a gas treatment system 10 according to the present disclosure. As shown, the gas treatment unit 10 includes an integrated amine and redox processing system which may be utilized to treat hydrocarbon containing gases as well as $CO_2$ and sulfur purification. More specifically, unit 10 includes an amine treatment unit 30 connected to a downstream redox unit 100. The amine unit 30 may purify natural gas and related hydrocarbon gases and generate a tail gas. The reduction oxidation ("redox") unit 100 receives the tail gas and purifies any $CO_2$ and sulfur contained in the tail gas.

The amine treatment unit 30 is configured to receive an influent gas stream 20 and produce at least two streams including a first amine effluent stream or a purified hydrocarbon gas stream 40 and a second amine effluent stream or tail gas stream 90. The influent gas stream 20 may include hydrocarbon containing gas from various sources including industry, by-products of oil processing and a sour natural gas extracted from a well, etc. In either case, the influent gas stream 20 may include various concentrations of constituents such as hydrocarbons, $H_2S$ and $CO_2$. The hydrocarbon gas stream 40 may be a sweetened natural gas or purified hydrocarbon gas stream, which may meet the requirements for natural gas production and/or use or require additional processing before the requirements are met. The tail gas stream 90 may be a fluid including as a gas, vapor and combination thereof and may include constituents such as $CO_2$, $H_2S$ and $H_2O$ vapor. Also, the tail gas 90 is released by the amine treatment unit 30 at an amine/redox connection pressure.

The redox unit 100 may be connected directly downstream from the amine unit 30 and receives second amine effluent or tail gas stream 90 at a pressure equal to or substantially equal to the amine/redox connection pressure. Next, the redox unit 100 may treat any toxic $H_2S$ and separates $CO_2$ from the tail gas stream 90. As a result, the redox unit 100 may produce a purified $CO_2$ gas stream 120 as well as an elemental sulfur stream 130.

To establish system 10 with the integrated amine and redox treatment unit, a pressure matched amine treatment unit 30 and redox unit 100 are provided. More specifically, the system 10 includes an amine treatment unit 30 capable of matching the pressure of the effluent tail gas stream 90 to the operational pressure of the redox unit 100. That is the amine unit 30 is capable of discharging tail gas stream 90 at the connection pressure, and the redox unit 100 is capable of operating at the equivalent and/or substantially equivalent connection pressure.

Due to the pressure matching of the amine treatment unit 30 and redox unit 100, the tail gas stream 90 may flow directly from the amine treatment unit 30 to the redox unit 100. Thus, the amine treatment unit 30 may be directly upstream from the redox unit 100, and the tail gas stream 90 may flow in an unaltered and/or untreated manner from the amine treatment unit 30 to the redox unit 100. As a result, there is no need to compress or alter the pressure of the tail gas stream 90 as it flows downstream from the amine treatment unit 30 to the redox unit 100. Thus, the integration of the amine unit 30 and redox unit 100 may greatly reduce the gas processing time as well as the initial capital expenses and ongoing maintenance and operational expenses.

The connection pressure, as used herein, may be a single pressure or a range of overlapping pressures. It is foreseeable that the amine unit 30 may be configured to operate and/or discharge stream 90 at a first range of pressures while the redox unit may be configured to receive stream 90 at either the same first range of pressures or a different second range of pressures. In the case of differing first and second pressure ranges, the connection pressure may be equivalent to a subset of equivalent pressures within the first and second ranges of pressures.

Figure 2:
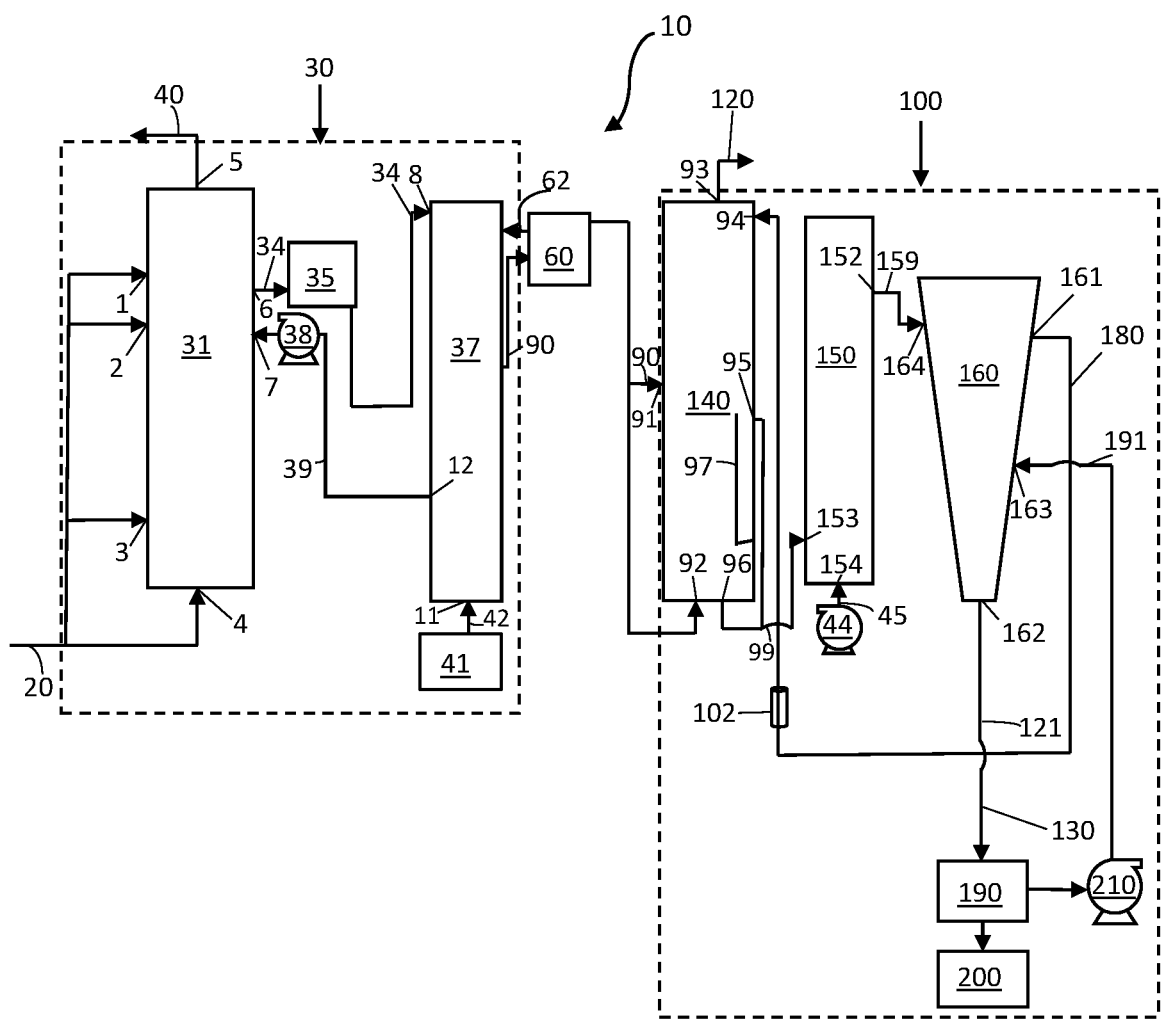
FIG. 2 is a second schematic diagram of a second embodiment, according to this disclosure, of a gas treatment unit.

FIG. 2 provides a schematic diagram of another embodiment, according to this disclosure, of the hydrocarbon treatment system 10. The amine treatment unit 30 and downstream redox unit 100 are shown in dashed line boxes with a water separation unit 60 therebetween. It is understood that the influent gas treatment parameters, desired treatment/purification standards and operating conditions may allow for modifications to unit 10 by adding or removing elements within the dashed line boxes.

An amine contactor 31 and amine reagent regeneration unit 37 are positioned upstream of a redox contactor 140 and redox reagent regeneration unit 190. A water separation system 60 is downstream from amine reagent regeneration unit 37, but upstream of the redox contactor 140. The tail gas stream 90 remains at the connection pressure and flows from the amine reagent regeneration unit 37 through the water separation system 60 to the redox contactor 140. The operating and capital expenses are reduced by integration of the amine and redox processing obviating the need for the compression the tail gas stream 90 for processing by the second stage or redox portion of the system 10.

The amine contactor 31 may have various configurations including a countercurrent bubble column or packed tower and/or tray, etc. and may include multiple inlet ports 1-4, 7 and outlet ports 5, 6. The influent gas stream 20 may enter the contactor 30 via conduit 20 and gas inlet ports 1-4. As shown, there are four gas stream inlet ports 1-4, but there may be more or less than four ports depending upon the desired unit configuration. A liquid amine reagent stream 39, which may include monoethanolamine (MEA), methyldiethanolamine (MDEA) and/or diethanolamine (DEA), etc. may enter the contacting unit 30 via an inlet port 7. The separated, purified and/or concentrated hydrocarbon gas stream or first amine effluent stream 40 may be released by the contactor 30 via port 5. A contacted amine reagent stream 34, which has absorbed the influent gas stream 20 constituents including $CO_2$ and $H_2S$, etc., may be released from the contactor 30 via port 6.

The contacted amine reagent stream 34 flows downstream to a flash tank 35 where it is prepared for entry into the amine reagent regeneration unit 37. A suitable flash tank as is known to one of ordinary skill in the art may be utilized.

The amine reagent regeneration unit 37 is configured to receive the contacted amine reagent stream 34 via port 8, and a water vapor stream 42 via port 11 from reboiler 41. The scrubbing or stripping process then allows the $CO_2$ and $H_2S$ to separate from the amine reagent. The regenerated amine reagent stream 39 is released from the scrubber 37 via port 12. The separated constituents including $CO_2$, and $H_2S$, etc. as well as water vapor are released from the scrubber 37, as stream 90, via outlet port 7.

A suitable amine reagent regeneration unit 37 may include strippers or scrubbers such as countercurrent, bi-directional bubble columns and/or packed towers, etc. However, the provided unit 37 is designed to operate at a pressure that will yield the stream 90 at the connection pressure. In other words, the unit 37 may operate at the connection pressure and/or discharge the stream 90 at the connection pressure.

Depending on the type of unit 37 selected (i.e., bubble or packed tower), the unit 37 operational pressure or first range of pressures may, for example, be within the range of approximately 15-25 PSI. In this case, the tail gas stream 90 pressure range and connection pressure may also be approximately 15-25 PSI.

A pump 38 transfers the amine reagent stream 39 into the contacting unit 30 via port 7. The amine reagent stream 39 is then used by the contactor 33 to separate the constituents of $CO_2$ and $H_2S$ from the influent gas 20 and generate effluent gas 40.

After leaving the scrubber 37, the tail gas stream 90 including $CO_2$, $H_2S$ and water vapor, etc. travels, at the connection pressure, downstream to water separation system 60 which may include a condenser (i.e. ambient air and/or water cooled) or any other suitable unit to remove the water vapor while the pressure of the first tail gas stream 90 remains constant. When the fluid is condensed, a liquid water or condensate stream 62 is produced and travels upstream to unit 37. Also, the condensed tail gas stream 90, which remains at the connection pressure, enters the downstream redox contactor 140. As shown, stream 90 may flow directly from the amine reagent regeneration unit 37 to the water separation system 60 and then directly to the redox contactor 140 as the condensed tail gas stream 90.

Alternatively, it is noted that tail gas stream 90 may flow directly downstream to the redox contactor 140 without passing through the water separation system 60.

The redox contactor 140 is configured to contact two immiscible fluids through either co-current contacting, countercurrent contacting or a combination thereof, as disclosed in U.S. patent application Ser. No. 17/552,727 filed on Dec. 16, 2021 and entitled "Co-current and Countercurrent Contactor for Immiscible Fluids" the contents of which are herein incorporated by reference in their entirety. Depending on the type of contactor 140 that is utilized, the contactor 140 may have one or multiple fluid stream inlet ports 91, 92 as well as two or more outlet ports 93, 95, 96. Preferably, as shown FIG. 1, the co-current/countercurrent contactor 140 is utilized and may include at least two fluid stream inlet ports 91, 92, at least one inlet port 94 configured to receive a reagent stream 180, a weir 97, and multiple outlet ports 93, 95 and 96. Based on the desired results of contacting the redox reagent stream 180 and fluid 90, the number of ports 91, 92 may be increased and placed in different positions and elevations on the contactor wall. Additionally, the contactor 140 may comprise a packed tower placed above the weir 97.

In this system 10, the selected contactor 140 is designed to receive the tail gas stream 90 at the connection pressure and operate at the connection pressure. Therefore, amine reagent regeneration unit 37 and contactor 140 are pressure matched. As discussed above the connection pressure may be a single pressure or a range of pressures. For example, if the first range of pressures is 15-25 PSI, then the contactor 140 is designed to operate at either the same pressure range or a second pressure range within the first pressure range or overlapping with the first pressure range. The pressure(s) corresponding to the overlap is the connection pressure or range of connection pressures.

When the condensed fluid stream 90 contacts a suitable reduction reagent stream 180 inside the contactor 140, $CO_2$ and $H_2S$ may be separated from the fluid 90. A suitable reagent 180 may include one or more of ferric salts, ferrous salts, ferric chelants, ferrous chelants, Fe-MGDA (ferric/ferrous methylglycinediacetate) such as Alanine, n,n-bid, (carboxymethyl) iron complex (CAS 547763-83-7), natural heme separated from natural organisms, whole organisms such as bacteria or yeast which include heme, and biosynthesized heme, etc.

If the reduction reagent stream 180 includes biosynthesized heme, a metallic porphyrin, such as iron porphyrins, may be preferred. Biosynthesized heme may be produced through recombinant DNA and genetic engineering of yeast. An example the biosynthesis of heme is described in U.S. Pat. Nos. 9,938,327 and 10,689,656 issued Apr. 10, 2018 and on Jun. 23, 2020, respectively, both of which are entitled "Expression Constructs and Methods of Genetically Engineering Methylotrophic Yeast", and the contents of both applications are herein incorporated by reference in their entirety.

When the reagent 180 contacts the $H_2S$ contained in stream 90, the sulfide ions in the fluid stream are reacted by bonding with the reagent 180 producing elemental sulfur and the $CO_2$ gas stream 120 is separated from the fluid 90 and released from the contactor 140 via port 93. A contacted reagent stream 99 then leaves the contactor 140 via countercurrent port 95 and co-current port 96. Thus, contactor 140 may yield purified $CO_2$ gas stream 120.

The temperature within the contactor 140, during operation, may be in the range of 80 to 140 degrees F. The operational temperature may be maintained by a heating unit 102 placed on stream 180.

Stream 99 is a dual stream 99 when it leaves the contactor 140 via ports 95, 96. The dual stream 99 may converge to a single stream 99. Next, stream 99 may enter the regeneration unit 190 via port 153.

The regeneration unit 190 may include a second inlet port 154 through which an oxidizing agent stream 45. A suitable oxidizing agent may include a solution of sodium percarbonate, inorganic peroxides (i.e., hydrogen peroxide, calcium peroxide, and magnesium peroxide), sodium persulfate, sodium chlorite, one or more of chlorine, hypochlorous acid, hypochlorite, chlorine dioxide, chlorite, perchlorate, permanganates, sodium, oxygen, and ozone. The oxidizing agent 45 is pumped via pump 44 into the regeneration unit where the oxidizing agent 45 mixes with the contacted reducing agent 99. The regenerated reagent containing sulfur leaves the regeneration unit as stream 159 via port 152. Suitable regeneration units 190 may include a co-current bubble column, or countercurrent packed tower, etc.

The temperature within unit 190, during operation, may be in the range of 80 to 140 degrees F. This may be maintained through the heating of stream 180 via heater 102.

Next, stream 159 enters a settling unit 160, via port 164, where the sulfur settles out of the regenerated reagent stream 99. Suitable settling 160 units may be a three-phase separator with a surge capacity for excess. The settling unit 160 has an outlet port 161 through which the regenerated reagent stream 180 leaves the settling unit 160. A second outlet port 162 in the settling unit 160 allows a solid sulfur and reagent stream 121 to exit the settling unit 160. Then, contactor 140 receives stream 180 at port 94 and uses the stream 180 as described above.

Stream 121 is received by a drying system 190 where stream 121 is further separated into sulfur and a regenerated reagent stream 191. The drying system 190 may include equipment such as a filter press, centrifuge, dewatering box, and/or filter bags. Also, there may be a backwash unit to refresh the equipment. The sulfur stream 130, which includes elemental sulfur, is placed in a storage unit 200 or tank for future use. The regenerated reagent stream 191 is recycled to the settling unit 160 by pump 210. The reagent stream 191 enters settling unit 160 via influent port 163.

Figure 3:
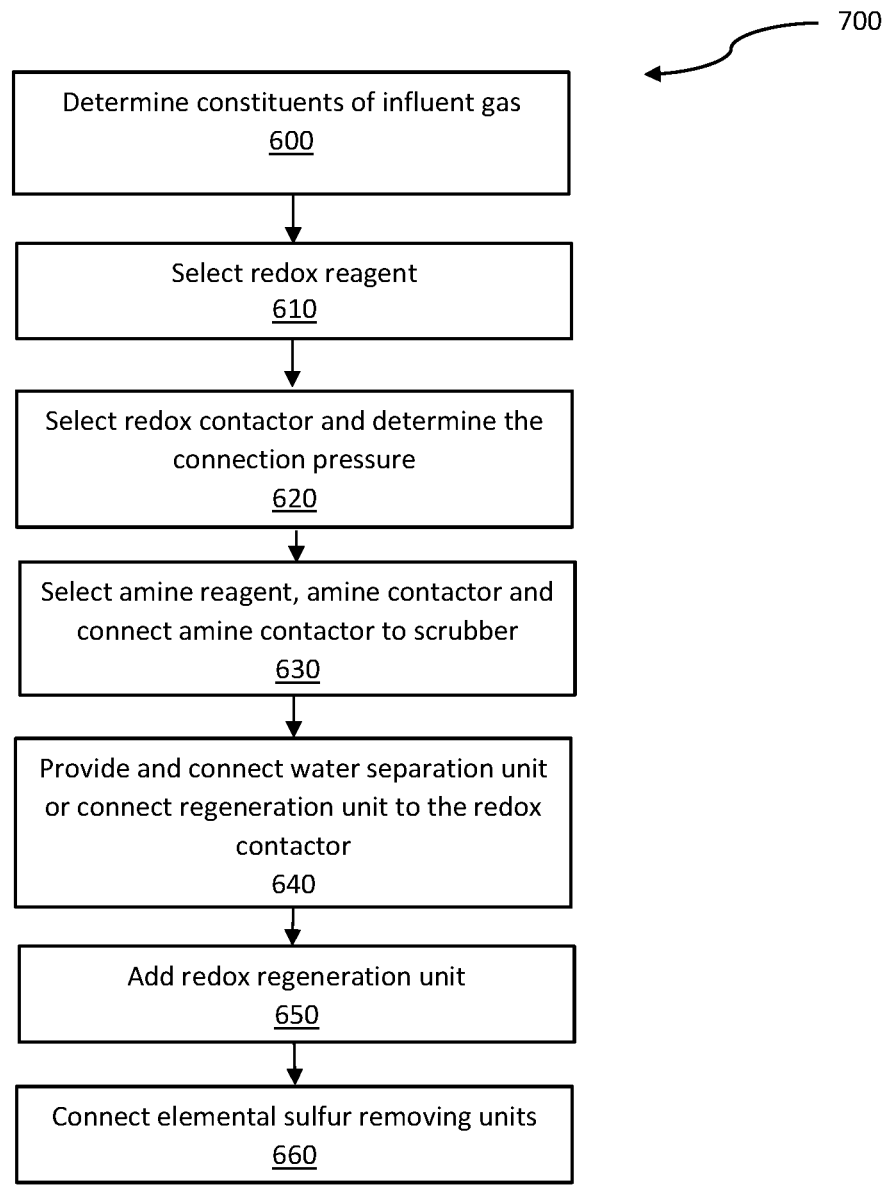
FIG. 3 depicts a flow diagram of an embodiment, according to this disclosure, of a method of making a gas treatment unit.

An embodiment, according to this disclosure, includes a method 700 of making the system 10 is shown in FIG. 3. The composition of the hydrocarbon gas stream may vary among industrial and well sources. Initially, in step 600, the influent gas stream 20 composition is determined. For example, the concentration of $CO_2$ and $H_2S$ as well as any other constituents may be determined.

Step 610 includes selecting a suitable redox reagent for the influent gas stream 20. The redox reagent may be chosen from the examples provided above.

Step 620 involves determining the co-current countercurrent contactor 140 size, type and operating parameters and providing the contactor 140. These determinations may be based on the selected reagent and the concentrations of $CO_2$ and $H_2S$ found in the influent gas stream 20. Determining the operating parameters includes determining the operational pressure or second range of operation pressures of the contactor 140. As discussed above, the operational pressure of the contactor 140 is the connection pressure.

Next, in step 630, the amine reagent regeneration unit 37 is provided such that unit 37 is capable of providing tail gas stream 90 at the connection pressure. A suitable unit 37 may be selected, as discussed above. As is known in the art, the operating pressure of unit 37 may be varied by altering the physical dimensions of unit 37. For example, increasing the tower height may increase the operating pressure of unit 37 as well as the pressure of unit 37 effluent. Therefore, a unit 37 capable of operating and discharging stream 90 at the connection pressure may be provided.

In step 640, the water separation unit 60 may be provided. Unit 60 may be connected downstream from the amine reagent regeneration unit 37 such that unit 60 receives the tail gas stream 90 directly from the regeneration unit 37. Also, unit 60 may be connected directly upstream of the redox contactor 140 such that unit 60 provides the condensed tail gas stream 90 directly to the contactor 140. The water separation unit 60 may also be directly connected upstream from the regeneration unit 37 as the separated water stream 62 is returned to the amine reagent regeneration unit 37.

If a water separation unit 60 is not provided, it is noted, that step 640, may alternatively include connecting the unit 37 directly upstream of contactor 140.

In step 650, an amine contactor 31 and suitable amine reagent are provided, and the amine contactor 31 is connected upstream from the amine reagent regeneration unit 37.

In step 660, to conserve the redox reagent, the redox reagent regeneration unit 190, as discussed above, may be connected downstream of the redox contactor 140 with the regenerated reagent stream 180 may be recirculated back to the contactor 140. Also, the heater 102 may be placed on the reagent stream 180 upstream of the contactor 140.

If the influent gas stream 120 contains $H_2S$, in step 670, the elemental sulfur removing units are added. The settling unit 160 and drying system 190, as discussed above, may be added. Then, the regenerated reagent stream 180 is recycled back to the contactor 140 from the settling unit 160. Also, the heater 102 is place on the reagent stream between the contactor 140 and settling unit 160.

Figure 4:
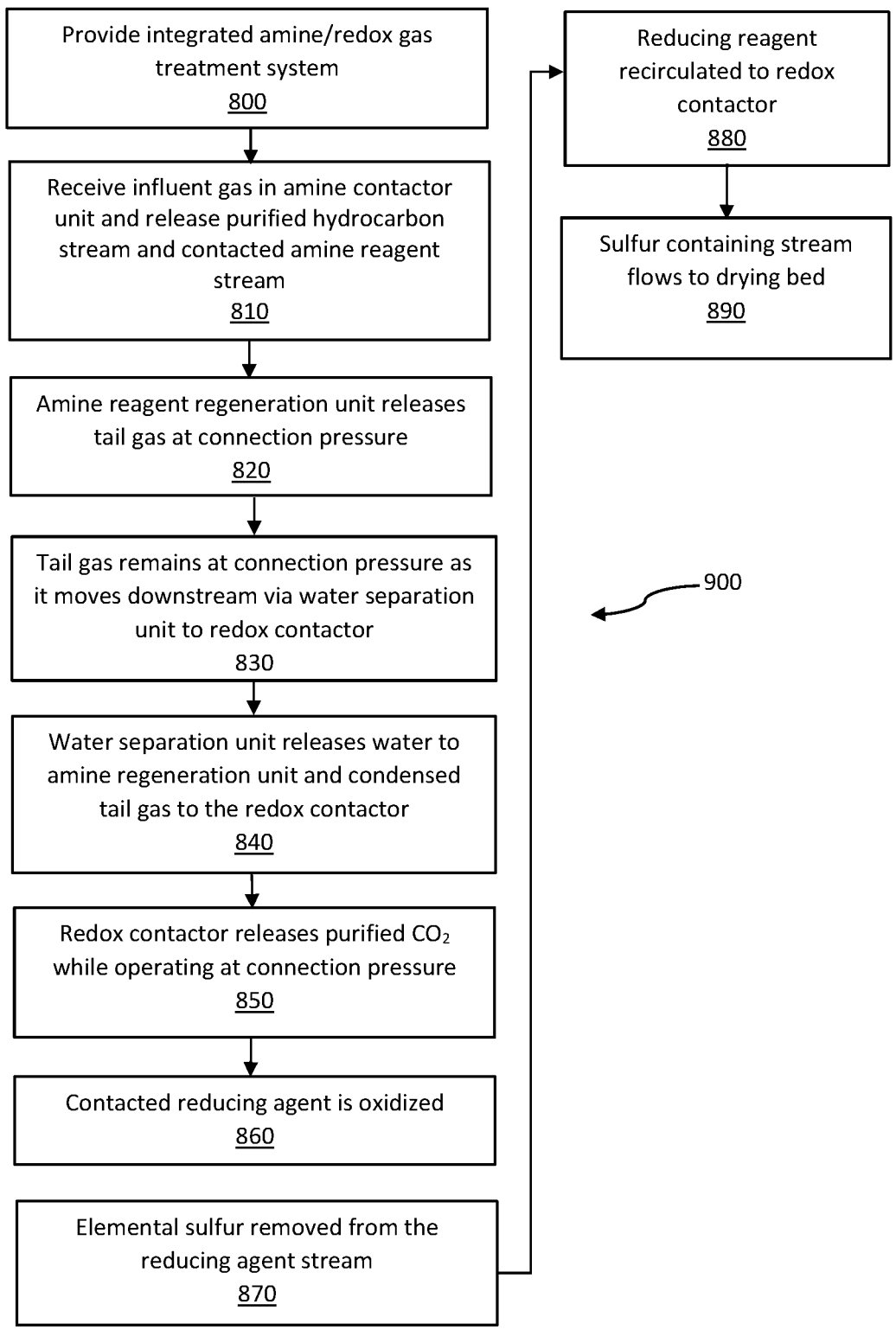
FIG. 4 depicts a flow diagram of an embodiment, according to this disclosure, of purifying a gas utilizing the gas treatment systems of FIGS. 1 and/or 2.

FIG. 4 depicts another embodiment, according to the present disclosure, of a method 900 of purifying $CO_2$ and/or elemental sulfur from an influent hydrocarbon gas stream 20. Initially, in Step 800, the system 10, as discussed above and provided in FIG. 2, is provided. Next, in step 810, the influent gas stream 20 is received by an amine contactor 31 which may release a first amine effluent stream 40 or purified hydrocarbon gas stream and a contacted reagent stream 39. Then, in step 820, the contacted reagent stream 39 is regenerated in a downstream amine reagent regeneration unit 37. The amine reagent regeneration unit 37 is operated at the connection pressure and releases a second amine effluent stream or tail gas stream 90 at the connection pressure.

In step 830, the stream 90 moves from the amine reagent regeneration unit 37 to the contactor 140 at the connection pressure or substantially the constant pressure. To conserve the amine reagent, the tail gas stream 90, which may include water vapor, may be passed through a water separator unit 60. As discussed above, the water separator 60 may remove or reduce the water vapor from the tail gas stream 90 by condensing the water vapor.

In step 840, the water stream 62 may be returned to the amine regeneration unit 37, while the condensed tail gas stream 90 moves downstream to the to the redox contactor 140.

In step 850, the contactor 140 contacts the reducing reagent stream 180 and the second amine effluent stream 90. More specifically, the contactor 140 may be a bi-directional contactor and contact streams 180 and 90 in both the co-current and countercurrent directions. As a result, a redox effluent stream 120, including purified $CO_2$, is released from contactor 140.

In step 860, as described above, the contacted reducing reagent stream 99 is oxidized in the regeneration unit 190.

In step 870, as described above, elemental sulfur is removed from the reducing reagent stream 159 via settling tank 160.

In step 880, the reducing reagent stream 180 is recirculated back through heater 102 to the contactor 140, and in step 890, the sulfur containing stream 121 flows to a drying bed 190.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

The invention claimed is:

1. A gas treatment system configured to treat an influent fluid stream including hydrocarbons and $CO_2$, the system comprising:
    an amine unit configured to separate the influent fluid stream into a first amine effluent stream including hydrocarbons and a second amine effluent stream including a connection pressure and comprising $CO_2$; and
    a reduction oxidation unit downstream of the amine unit, the reduction oxidation unit configured to receive the second amine effluent stream from the amine unit and operate at the connection pressure while releasing a reduction oxidation effluent stream including purified $CO_2$, the purified $CO_2$ corresponding to only the $CO_2$ in the second amine effluent stream,
    wherein the connection pressure includes a single pressure or a plurality of pressures at which both the amine unit and the reduction oxidation unit are configured to operate.

2. The system of claim 1, wherein the amine unit is connected directly upstream of the reduction oxidation unit such that the second amine effluent stream flows directly from the amine unit to the reduction oxidation unit.

3. The system of claim 1, wherein the second amine effluent stream remains at the connection pressure as it flows downstream from the amine unit to the reduction oxidation unit.

4. The system of claim 1, wherein the reduction oxidation unit further comprises:
    a co-current and countercurrent contactor configured to operate at the connection pressure while contacting a reducing reagent and the second amine effluent stream, the contactor configured to release the reduction oxidation effluent stream including purified $CO_2$.

5. The system of claim 4, wherein the reducing reagent comprises ferric salts, ferrous salts, ferric chelants, ferrous chelants, Fe-MGDA, HEME, organisms containing HEME, or a combination thereof.

6. A gas treatment system configured to receive an influent fluid stream including hydrocarbons, the system comprising:
    an amine unit configured to separate the influent fluid stream into a first amine effluent stream including hydrocarbons and a second amine effluent stream including a connection pressure and comprising $CO_2$, water vapor or any combination thereof;
    a water separation unit downstream of the amine treatment unit, the water separation unit configured to receive the second amine effluent stream and reduce the water vapor from the second amine effluent stream and a separator effluent stream including the connection pressure and comprising $CO_2$, and
    a reduction oxidation unit downstream of the water separation unit, the reduction oxidation unit configured to receive the separator effluent stream from the water separation unit and operate at the connection pressure while releasing a reduction oxidation effluent stream including purified $CO_2$, the purified $CO_2$ corresponding to only the $CO_2$ in the separator effluent stream,
    wherein the connection pressure includes a single pressure or a plurality of pressures at which both the amine unit and the reduction oxidation unit are configured to operate.

7. The system of claim 6, wherein the water separation unit is directly downstream of the amine unit and directly upstream of the reduction oxidation unit.

8. The system of claim 6, wherein the amine unit further comprises:
    an amine contactor configured to contact the influent fluid stream and an amine reagent stream, and release the first amine effluent stream and a contacted reagent stream including the amine reagent and CO2; and
    an amine reagent regeneration unit downstream of the amine contactor, the amine reagent regeneration unit configured to regenerate the contacted amine reagent stream while operating at the connection pressure, the amine reagent regeneration unit configured to release the second amine effluent stream from the amine unit to the water separator unit.

9. The system of claim 6, wherein the reduction oxidation unit further comprises:
    a reduction oxidation contactor configured to receive the separator effluent stream and configured to operate at the connection pressure while contacting a reducing reagent and the separator effluent stream, the reduction oxidation contactor configured to release the reduction oxidation effluent stream including purified CO2.

10. The system of claim 9, wherein the reduction oxidation contactor comprises a bi-directional contactor configured for both countercurrent and co-current contact between the separator effluent stream and the reducing reagent.

11. The system of claim 6, wherein the water separation unit is a condenser.

12. The system of claim 9, wherein the reducing reagent comprises:
    ferric salts, ferrous salts, ferric chelants, ferrous chelants, Fe-MGDA, HEME, organisms containing HEME, or a combination thereof.

13. A gas treatment system configured to treat an influent fluid stream including hydrocarbons and CO2, the system comprising:
    an amine unit configured to receive and separate the influent fluid stream into a first amine effluent stream including hydrocarbons and a second amine effluent stream including a connection pressure and comprising CO2, the amine unit being an initial unit to treat the influent fluid by chemical contact; and a reduction oxidation unit downstream of the amine unit, the reduction oxidation unit configured to receive the second amine effluent stream from the amine unit and operate at the connection pressure while releasing a reduction oxidation effluent stream including purified CO2, wherein the connection pressure includes a single pressure or a plurality of pressures at which both the amine unit and the reduction oxidation unit are configured to operate.

14. The system of claim 13, wherein the purified $CO_2$ corresponds to only the $CO_2$ in the second amine effluent stream.

* * * * *